(12) United States Patent
Fassam et al.

(10) Patent No.: US 8,801,165 B2
(45) Date of Patent: Aug. 12, 2014

(54) PRINTING INK, APPARATUS AND METHOD

(75) Inventors: Robert Augustus Fassam, Broadstairs (GB); Nigel Gould, Broadstairs (GB); Jeremy Ward, Broadstairs (GB); Barry McGregor, Godmanchester (GB)

(73) Assignee: Sericol Limited, Kent (GB)

( * ) Notice: Subject to any disclaimer, the term of this patent is extended or adjusted under 35 U.S.C. 154(b) by 152 days.

(21) Appl. No.: 13/391,592

(22) PCT Filed: Aug. 20, 2010

(86) PCT No.: PCT/GB2010/051384
§ 371 (c)(1),
(2), (4) Date: May 3, 2012

(87) PCT Pub. No.: WO2011/021052
PCT Pub. Date: Feb. 24, 2011

(65) Prior Publication Data
US 2012/0206534 A1 Aug. 16, 2012

(30) Foreign Application Priority Data

Aug. 21, 2009 (GB) .................... 0914648.1
Aug. 21, 2009 (GB) .................... 0914652.3
Nov. 19, 2009 (GB) .................... 0920271.4

(51) Int. Cl.
| | |
|---|---|
| *B41J 2/01* | (2006.01) |
| *C09D 11/00* | (2014.01) |
| *C09D 11/10* | (2014.01) |
| *B41J 11/00* | (2006.01) |
| *B41M 7/00* | (2006.01) |

(52) U.S. Cl.
CPC ............ *B41J 11/002* (2013.01); *C09D 11/40* (2013.01); *B41M 7/009* (2013.01); *C09D 11/101* (2013.01); *B41M 7/0081* (2013.01); *C09D 11/322* (2013.01)

USPC .......................................... 347/100

(58) Field of Classification Search
USPC .......................................... 347/100
See application file for complete search history.

(56) References Cited

U.S. PATENT DOCUMENTS

| | | |
|---|---|---|
| 4,907,029 A | 3/1990 | Caprari |
| 5,270,368 A | 12/1993 | Lent et al. |

(Continued)

FOREIGN PATENT DOCUMENTS

| | | |
|---|---|---|
| EP | 1 598 391 A1 | 11/2005 |
| EP | 1621260 A1 | 1/2006 |

(Continued)

OTHER PUBLICATIONS

International Search Report for corresponding application No. PCT/GB2010/051384 mailed Apr. 6, 2011.

(Continued)

*Primary Examiner* — Laura Martin
(74) *Attorney, Agent, or Firm* — Wood, Phillips, Katz, Clark & Mortimer

(57) ABSTRACT

The present invention provides an inkjet ink comprising at least 30% by weight of organic solvent based on the total weight of the ink, a radiation curable material, a photoinitiator and optionally a colorant. The invention also provides an apparatus for printing the ink wherein the apparatus comprises at least one printhead, a means for evaporating solvent from the printed ink and a source of actinic radiation. Furthermore, the invention provides a method of inkjet printing comprising i) inkjet printing the inkjet ink as defined above on to a substrate; ii) evaporating at least a portion of the solvent from the printed ink; and iii) exposing the printed ink to actinic radiation to cure the radiation curable material.

18 Claims, 4 Drawing Sheets

(56) References Cited

U.S. PATENT DOCUMENTS

| | | |
|---|---|---|
| 6,467,897 B1 | 10/2002 | Wu et al. |
| 2003/0112312 A1 | 6/2003 | Gelbart |
| 2004/0075726 A1 | 4/2004 | Hirai |
| 2004/0201661 A1 | 10/2004 | Li |
| 2004/0246323 A1 | 12/2004 | Ishikawa |
| 2005/0113483 A1* | 5/2005 | Takabayashi ............ 523/160 |
| 2006/0075917 A1 | 4/2006 | Edwards |
| 2008/0049088 A1 | 2/2008 | Codos |
| 2010/0323284 A1* | 12/2010 | Nakashima et al. ............ 430/7 |

FOREIGN PATENT DOCUMENTS

| | | |
|---|---|---|
| EP | 1 629 979 A1 | 3/2006 |
| EP | 1 867 489 A1 | 12/2007 |
| EP | 1650042 A1 | 12/2010 |
| JP | 61287794 A | 12/1986 |
| WO | 97/04964 A1 | 2/1997 |
| WO | 02078958 A1 | 10/2002 |
| WO | 2007/057632 A2 | 5/2007 |
| WO | 2008/070563 A1 | 6/2008 |
| WO | 2008/081996 A2 | 7/2008 |
| WO | WO 2008081996 A2 * | 7/2008 ............ C03F 7/00 |

OTHER PUBLICATIONS

International Preliminary Report on Patentability for corresponding application No. PCT/GB2010/051384 mailed Dec. 27, 2011.
Search Report for corresponding application GB0914648.1.

* cited by examiner

PRINTING INK, APPARATUS AND METHOD

This application is filed under 35 U.S.C. §371 as the U.S. National Stage of International Application PCT/GB2010/051384, filed Aug. 20, 2010, which claims priority of the United Kingdom Patent Application No. 0914648.1, filed on Aug. 21, 2009, United Kingdom Patent Application No. 0914652.3, filed on Aug. 21, 2009 and United Kingdom Patent Application No. 0920271.4, filed on Nov. 19, 2009, the contents of which are hereby incorporated by reference in their entirety.

FIELD OF THE INVENTION

The present invention relates to a printing ink, a printing apparatus and a method of printing. In particular the invention relates to an inkjet ink, an inkjet printing apparatus and a method of inkjet printing.

BACKGROUND OF THE INVENTION

Digital inkjet printing is becoming an increasingly popular method for the production of fine graphic images for advertising, due to its low implementation cost and versatility in comparison with traditional techniques such as lithographic and screen printing. Inkjet printers comprise one or more printheads that include a series of nozzles through which ink is ejected onto a substrate. The printheads are typically provided on a printer carriage that traverses the print width (moves back and forth across the substrate) during the printing process.

Two main ink chemistries are used inks that dry by solvent evaporation and inks that dry by exposure to ultraviolet radiation. Wide format solvent-based inkjet printers are an economic route into the industry as they are a relatively low cost option compared to the more complex machines employed for UV curing. Solvent-based inkjet printing also has other advantages. As well as the lower cost, the ink films produced are thinner (and therefore flexible) and yield a good quality natural looking image with a gloss finish. Furthermore, it is difficult to achieve very high pigment loadings in UV curable inks due to the high viscosity of the ink: if too much pigment is added, the ink becomes too viscous and cannot be jetted. In contrast, solvent-based inks include a high proportion of solvent and therefore have a lower viscosity, which means that higher pigment loadings can be tolerated. In addition, the printed film produced from solvent-based inkjet inks is formed predominantly of pigment along with comparatively few other solids that are included in the ink. The pigment is therefore largely unobscured, resulting in intense, vivid and vibrant colours and a large colour gamut.

However, there are some limitations to solvent-based inkjet technology. In particular, solvent-based inks may not adhere to certain types of substrate, particularly non-porous substrates such as plastics, and the cured films have poor resistance to solvents.

There therefore exists a need for an alternative inkjet ink and a printing apparatus that is capable of printing the ink.

BRIEF SUMMARY OF THE INVENTION

Accordingly, the present invention provides an inkjet ink comprising at least 30% by weight of organic solvent based on the total weight of the ink, a radiation curable material, a photoinitiator and optionally a colourant.

The present invention also provides an inkjet printing apparatus for printing a solvent-based inkjet ink comprising at least one printhead, a means for evaporating solvent from the printed ink and a source of actinic radiation.

The present invention also provides a method of printing the inkjet ink as defined above using the apparatus as defined above, the method comprising:
    jetting the ink from the printhead onto a substrate;
    evaporating at least a portion of the solvent from the printed ink; and
    exposing the printed ink to actinic radiation to cure the radiation curable material.

BRIEF DESCRIPTION OF THE DRAWINGS

The present invention will now be described with reference to the accompanying drawings, in which.

DETAILED DESCRIPTION OF THE INVENTION

Figure 1:
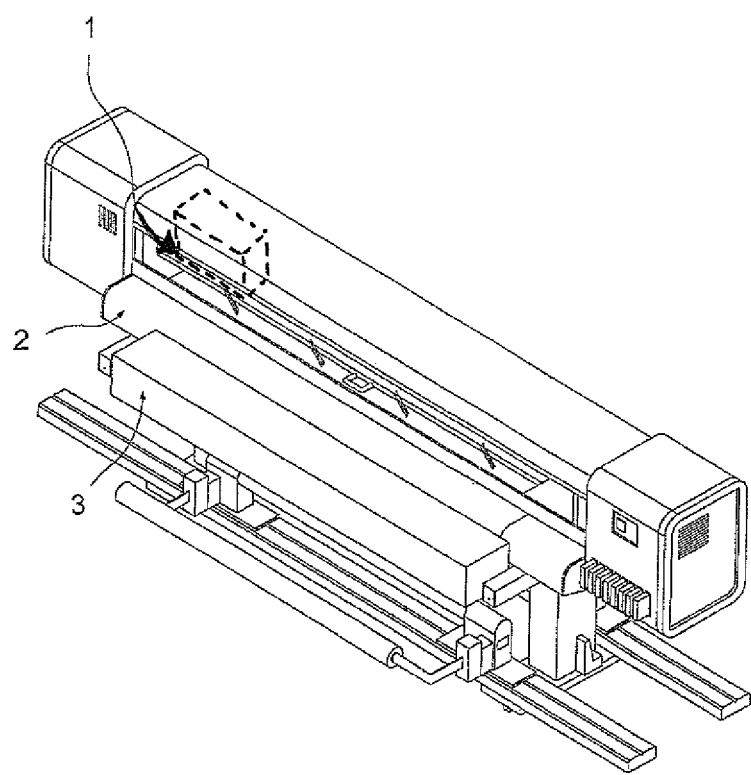
FIG. 1 shows a perspective view of an exemplary embodiment of an inkjet printing apparatus according to the present invention.

The inks of the present invention comprise a modified ink binder system. The presence of a radiation curable material and a photoinitiator in the ink means that crosslinks can be formed in the dried ink film, leading to improved adhesion to a range of substrates and improved resistance to solvents. The presence of at least 30% by weight of organic solvent means that the advantageous properties of solvent-based inkjet inks are expected to be maintained, however.

By "radiation curable material" is meant a material that polymerises or crosslinks when exposed to radiation, commonly ultraviolet light, in the presence of a photoinitiator.

The radiation curable material can comprise a monomer with a molecular weight of 450 or less, an oligomer, or mixtures thereof. The monomers and/or oligomers may possess different degrees of functionality, and a mixture including combinations of mono, di, tri and higher functionality monomers and/or oligomers may be used.

Preferably, the radiation curable material comprises a radiation curable oligomer.

Radiation curable oligomers suitable for use in the present invention comprise a backbone, for example a polyester, urethane, epoxy or polyether backbone, and one or more radiation polymerisable groups. The polymerisable group can be any group that is capable of polymerising upon exposure to radiation.

Preferred oligomers have a molecular weight of 500 to 4000, more preferably 600 to 4000. Molecular weights can be calculated if the structure of the oligomer is known or molecular weights can be measured using gel permeation chromatography using polystyrene standards. Thus, for polymeric materials, number average molecular weights can be obtained using gel permeation chromatography and polystyrene standards.

In one embodiment the radiation curable material polymerises by free radical polymerisation.

Suitable free radical polymerisable monomers are well known in the art and include (meth)acrylates, $\alpha,\beta$-unsaturated ethers, vinyl amides and mixtures thereof.

Monofunctional (meth)acrylate monomers are well known in the art and are preferably the esters of acrylic acid. Preferred examples include phenoxyethyl acrylate (PEA), cyclic TMP formal acrylate (CTFA), isobornyl acrylate (IBOA), tetrahydrofurfuryl acrylate (THFA), 2-(2-ethoxyethoxy) ethyl acrylate, octadecyl acrylate (ODA), tridecyl acrylate (TDA), isodecyl acrylate (IDA) and lauryl acrylate. PEA is particularly preferred.

Suitable multifunctional (meth)acrylate monomers include di-, tri- and tetra-functional monomers. Examples of the multifunctional acrylate monomers that may be included in the ink-jet inks include hexanediol diacrylate, trimethylolpropane triacrylate, pentaerythritol triacrylate, polyethyleneglycol diacrylate (for example tetraethyleneglycol diacrylate), dipropyleneglycol diacrylate, tri(propylene glycol) triacrylate, neopentylglycol diacrylate, bis(pentaerythritol) hexaacrylate, and the acrylate esters of ethoxylated or propoxylated glycols and polyols, for example, propoxylated neopentyl glycol diacrylate, ethoxylated trimethylolpropane triacrylate, and mixtures thereof.

Suitable multifunctional (meth)acrylate monomers also include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate, 1,4-butanediol dimethacrylate. Mixtures of (meth)acrylates may also be used.

(Meth)acrylate is intended herein to have its standard meaning, i.e. acrylate and/or methacrylate. Mono and multifunctional are also intended to have their standard meanings, i.e. one and two or more groups, respectively, which take part in the polymerisation reaction on curing.

α,β-unsaturated ether monomers can polymerise by free radical polymerisation and may be useful for reducing the viscosity of the ink when used in combination with one or more (meth)acrylate monomers. Examples are well known in the art and include vinyl ethers such as triethylene glycol divinyl ether, diethylene glycol divinyl ether, 1,4-cyclohexanedimethanol divinyl ether and ethylene glycol monovinyl ether. Mixtures of α,β-unsaturated ether monomers may be used.

N-vinyl amides and N-(meth)acryloyl amines may also be used in the inks of the invention. N-vinyl amides are well-known monomers in the art and a detailed description is therefore not required. N-vinyl amides have a vinyl group attached to the nitrogen atom of an amide which may be further substituted in an analogous manner to the (meth) acrylate monomers. Preferred examples are N-vinyl caprolactam (NVC) and N-vinyl pyrrolidone (NVP). Similarly, N-acryloyl amines are also well-known in the art. N-acryloyl amines also have a vinyl group attached to an amide but via the carbonyl carbon atom and again may be further substituted in an analogous manner to the (meth)acrylate monomers. A preferred example is N-acryloylmorpholine (ACMO).

Particularly preferred radiation curable materials are oligomers with free radical polymerisable groups, preferably (meth)acrylate groups. Acrylate functional oligomers are most preferred.

In one embodiment the oligomer comprises two or more radical polymerisable groups, preferably three or more, more preferably four or more. Oligomers comprising six polymerisable groups are particularly preferred.

The oligomer preferably comprises a urethane backbone.

Particularly preferred radiation curable materials are urethane acrylate oligomers as these have excellent adhesion and elongation properties. Most preferred are tri-, tetra-, penta-, hexa- or higher functional urethane acrylates, particularly hexafunctional urethane acrylates as these yield films with good solvent resistance.

Other suitable examples of radiation curable oligomers include epoxy based materials such as bisphenol A epoxy acrylates and epoxy novolac acrylates, which have fast cure speeds and provide cured films with good solvent resistance.

The radiation curable oligomer used in the preferred inks of the invention cures upon exposure to radiation in the presence of a photoinitiator to form a crosslinked, solid film. The resulting film has good adhesion to substrates and good solvent resistance. Any radiation curable oligomer that is compatible with the remaining ink components and that is capable of curing to form a crosslinked, solid film is suitable for use in the ink of the present invention. Thus, the ink formulator is able to select from a wide range of suitable oligomers. In particular, the oligomer can be a low molecular weight material that is in liquid form at 25° C. This is beneficial when aiming to produce a low viscosity ink. Furthermore, the use of a low molecular weight, liquid oligomer is advantageous when formulating the ink because low molecular weight liquid oligomers are likely to be miscible in a wide range of solvents.

Preferred oligomers for use in the invention have a viscosity of 0.5 to 20 Pa·s at 60° C., more preferably 5 to 15 Pa·s at 60° C. and most preferably 5 to 10 Pa·s at 60° C. Oligomer viscosities can be measured using an ARG2 rheometer manufactured by T.A. Instruments, which uses a 40 mm oblique/2° steel cone at 60° C. with a shear rate of 25 seconds$^{-1}$.

In one embodiment the radiation curable material comprises 50 to 100%, or 75 to 100% by weight of free radical curable oligomer and 0 to 50%, or 0 to 25% by weight of free radical curable monomer, based on the total weight of radiation curable material present in the ink.

Preferably the ink comprises less than 20% by weight of (meth)acrylates with a molecular weight of less than 450 based on the total weight of the ink, or less than 10% by weight, more preferably less than 5% by weight. In a particularly preferred embodiment, the ink of the invention is substantially free of (meth)acrylates with a molecular weight of less than 450.

In one embodiment the ink comprises less than 20% by weight of (meth)acrylates with a molecular weight of less than 600 based on the total weight of the ink, or less than 10% by weight, more preferably less than 5% by weight. In a particularly preferred embodiment, the ink of the invention is substantially free of (meth)acrylates with a molecular weight of less than 600.

By "substantially free" is meant that no (meth)acrylate with a molecular weight of less than 450 or 600, respectively, is intentionally added to the ink. However, minor amounts of (meth)acrylates with a molecular weight of less than 450 or 600, respectively, that may be present as impurities in commercially available radiation curable oligomers, for example, are tolerated.

In an alternative embodiment of the invention the radiation curable material is capable of polymerising by cationic polymerisation. Suitable materials include, oxetanes, cycloaliphatic epoxides, bisphenol A epoxides, epoxy novolacs and the like. The radiation curable material according to this embodiment may comprise a mixture of cationically curable monomer and oligomer. For example, the radiation curable material may comprise a mixture of an epoxide oligomer and an oxetane monomer.

In one embodiment the radiation curable material comprises 0 to 40% by weight of cationically curable oligomer and 60 to 100% by weight of cationically curable monomer based on the total weight of radiation curable material present in the ink.

The radiation curable material can also comprise a combination of free radical polymerisable and cationically polymerisable materials.

The radiation curable material is preferably present in the composition in an amount of 2% to 65% by weight, based on the total weight of the ink, more preferably 2 to 45% by weight, more preferably 5 to 35% by weight, more preferably 8 to 25% by weight, and most preferably 10% to 25% by weight.

The ink of the invention includes one or more photoinitiators. When the ink of the invention includes a free radical polymerisable material the photoinitiator system includes a free radical photoinitiator and when the ink includes a cationic polymerisable material the photoinitiator system includes a cationic photoinitiator. When the ink comprises a combination of free radical polymerisable and cationically polymerisable materials both a free radical and cationic initiator are required.

The free radical photoinitiator can be selected from any of those known in the art. For example, benzophenone, 1-hydroxycyclohexyl phenyl ketone, 1-[4-(2-Hydroxyethoxy)-phenyl]-2-hydroxy-2-methyl-1-propane-1-one, 2-benzyl-2-dimethylamino-(4-morpholinophenyl)butan-1-one, isopropyl thioxanthone, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure and Darocur (from Ciba) and Lucerin (from BASF).

In the case of a cationically curable system, any suitable cationic initiator can be used, for example sulphonium or iodonium based systems. Non limiting examples include Rhodorsil PI 2074 from Rhodia; MC AA, MC BB, MC CC, MC CC PF, MC SD from Siber Hegner; UV9380c from Alfa Chemicals; Uvacure 1590 from UCB Chemicals; and Esacure 1064 from Lamberti spa.

Preferably the photoinitiator is present in an amount of 1 to 20% by weight, preferably 4 to 10% by weight, based on the total weight of the ink.

The ink of the invention contains an organic solvent. The organic solvent is in the form of a liquid at ambient temperatures and is capable of acting as a carrier for the remaining components of the ink. The organic solvent component of the ink of the invention may be a single solvent or a mixture of two or more solvents. As with known solvent-based inkjet inks, the organic solvent used in the ink of the present invention is required to evaporate from the printed ink, typically on heating, in order to allow the ink to dry. The solvent can be selected from any solvent commonly used in the printing industry, such as glycol ethers, glycol ether esters, alcohols, ketones, esters and pyrrolidones.

The organic solvent is preferably present in an amount of at least 40% by weight, more preferably at least 45% by weight, and more preferably at least 50% by weight, for example 50 to 85% by weight, or 50% to 80% by weight based on the total weight of the ink. In a particularly preferred embodiment the organic solvent is present in an amount of at least 55% by weight, for example 60 to 85%, or 60% to 75% by weight based on the total weight of the ink.

Known solvent-based inkjet inks dry solely by solvent evaporation with no crosslinking or polymerisation occurring. The film produced therefore has limited chemical resistance properties. In order to improve resistance of prints to common solvents such as alcohols and petrol, binder materials that have limited solubility in these solvents are added to the ink. The binder is typically in solid form at 25° C. so that a solid printed film is produced when solvent is evaporated from the ink. Suitable binders such as vinyl chloride copolymer resins generally have poor solubility in all but the strongest of solvents such as glycol ether acetates and cyclohexanone, both of which are classified as "harmful" and have strong odours. In order to solubilise the binder, these solvents are generally added to the ink.

The ink of the present invention includes radiation curable material that cures as the ink dries and it is not therefore necessary to include a binder in the ink in order to provide a printed film having improved solvent resistance. In one embodiment of the invention the organic solvent is not therefore required to solubilise a binder such as a vinyl chloride copolymer resin, which means that the ink formulator has more freedom when selecting a suitable solvent or solvent mixture.

In a preferred embodiment the organic solvent is a low toxicity and/or a low odour solvent. Solvents that have been given VOC exempt status by the United States Environmental Protection Agency or European Council are also preferred.

The most preferred solvents are selected from glycol ethers and organic carbonates and mixtures thereof. Cyclic carbonates such as propylene carbonate and mixtures of propylene carbonate and one or more glycol ethers are particularly preferred.

Alternative preferred solvents include lactones, which have been found to improve adhesion of the ink to PVC substrates. Mixtures of lactones and one or more glycol ethers, and mixtures of lactones, one or more glycol ethers and one or more organic carbonates are particularly preferred. Mixtures of gamma butyrolactone and one or more glycol ethers, and mixtures of gamma butyrolactone, one or more glycol ethers and propylene carbonate are particularly preferred.

In another embodiment of the invention, dibasic esters and/or bio-solvents may be used.

Dibasic esters are known solvents in the art. They can be described as di($C_1$-$C_4$ alkyl) esters of a saturated aliphatic dicarboxylic acid having 3 to 8 carbon atoms having following general formula:

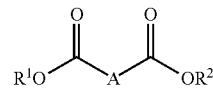

in which A represents $(CH_2)_{1-6}$, and $R^1$ and $R^2$ may be the same or different and represent $C_1$-$C_4$ alkyl which may be a linear or branched alkyl radical having 1 to 4 carbon atoms, preferably methyl or ethyl, and most preferably methyl. Mixtures of dibasic esters can be used.

Bio-solvents, or solvent replacements from biological sources, have the potential to reduce dramatically the amount of environmentally-polluting VOCs released in to the atmosphere and have the further advantage that they are sustainable. Moreover, new methods of production of bio-solvents derived from biological feedstocks are being discovered, which allow bio-solvent production at lower cost and higher purity.

Examples of bio-solvents include soy methyl ester, lactate esters, polyhydroxyalkanoates, terpenes and non-linear alcohols, and D-limonene. Soy methyl ester is prepared from soy. The fatty acid ester is produced by esterification of soy oil with methanol. Lactate esters preferably use fermentation-derived lactic acid which is reacted with methanol and/or ethanol to produce the ester. An example is ethyl lactate which is derived from corn (a renewable source) and is approved by the FDA for use as a food additive. Polyhydroxyalkanoates are linear polyesters which are derived from fermentation of sugars or lipids. Terpenes and non linear alcohol may be derived from corn cobs/rice hulls. An example is D-limonene which may be extracted from citrus rinds.

Other solvents may be included in the organic solvent component. A particularly common source of other solvents is derived from the way in which the colouring agent is introduced into the inkjet ink formulation. The colouring agent is usually prepared in the form of a pigment dispersion in a solvent, e.g. 2-ethylhexyl acetate. The solvent tends to be around 40 to 50% by weight of the pigment dispersion based on the total weight of the pigment dispersion and the pigment dispersion typically makes up around 5 to 15% by weight of the ink and sometimes more.

The ink is preferably substantially free of water, although some water will typically be absorbed by the ink from the air or be present as impurities in the components of the inks, and such levels are tolerated. For example, the ink may comprise less than 5% by weight of water, more preferably less than 2% by weight of water and most preferably less than 1% by weight of water, based on the total weight of the ink.

The ink of the present invention can be a coloured ink or a colourless ink.

By "colourless" is meant that the ink is substantially free of colourant such that no colour can be detected by the naked eye. Minor amounts of colourant that do not produce colour that can be detected by the eye can be tolerated, however. Typically the amount of colourant present will be less than 0.3% by weight based on the total weight of the ink, preferably less than 0.1%, more preferably less than 0.03%. Colourless inks may also be described as "clear" or "water white".

Coloured inks of the invention comprise at least one colouring agent. The colouring agent may be either dissolved or dispersed in the liquid medium of the ink. Preferably the colouring agent is a dispersible pigment, of the types known in the art and commercially available such as under the tradenames Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect of the invention the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 µm, preferably less than 5 µm, more preferably less than 1 µm and particularly preferably less than 0.5 µm.

The colourant is preferably present in an amount of 20 weight % or less, preferably 10 weight % or less, more preferably 8 weight % or less and most preferably 2 to 5% by weight, based on the total weight of the ink. A higher concentration of pigment may be required for white inks, however, for example up to and including 30 weight %, or weight % based on the total weight of the ink.

The ink can optionally contain a thermoplastic resin. The thermoplastic resin does not include reactive groups that are able to crosslink on exposure to radiation. In other words, thermoplastic resin is not a radiation curable material. Suitable materials have molecular weights ranging from 10,000 to 100,000 as determined by GPC with polystyrene standards. The thermoplastic resin can be selected from epoxy, polyester, vinyl or (meth)acrylate resins, for example. Methacrylate copolymers are preferred. When present, the ink can comprise 1 to 5% by weight of thermoplastic resin, based on the total weight of the ink. The thermoplastic resin increases the viscosity of the ink film prior to curing, leading to improved print definition. The thermoplastic resin also decreases the glass transition temperature of the cured ink, giving greater film flexibility for applications such as vehicle side application.

In one embodiment, the ink of the invention comprises at least 50% by weight of organic solvent based on the total weight of the ink; a radiation curable material, wherein the radiation curable material comprises 50 to 100% by weight of free radical curable oligomer having a molecular weight of 600 to 4000 and 0 to 50% by weight of free radical curable monomer having a molecular weight of 450 or less based on the total weight of radiation curable material present in the ink; a free radical photoinitiator; and optionally a colourant.

The inkjet ink exhibits a desirable low viscosity (200 mPa·s or less, preferably 100 mPa·s or less, more preferably 25 mPa·s or less, more preferably 10 mPa·s or less and most preferably 7 mPa·s or less at 25° C.).

In order to produce a high quality printed image a small jetted drop size is desirable. Furthermore, small droplets have a higher surface area to volume ratio when compared to larger drop sizes, which facilitates evaporation of solvent from the jetted ink. Small drop sizes therefore offer advantages in drying speed. Preferably the inkjet ink of the invention is jetted at drop sizes below 50 picoliters, preferably below 30 picoliters and most preferably below 10 picoliters.

To achieve compatibility with print heads that are capable of jetting drop sizes of 50 picoliters or less, a low viscosity ink is required. A viscosity of 10 mPa·s or less at 25° C. is preferred, for example, 2 to 10 mPas, 4 to 8 mPa·s, or 5 to 7 mPa·s. It is problematic to achieve these low viscosities with conventional radiation curable inks due to the relatively high viscosities of acrylate monomers and oligomers used in the compositions, but the presence of a significant amount of organic solvent in the ink of the invention allows these low viscosities to be achieved.

Ink viscosity may be measured using a Brookfield viscometer fitted with a thermostatically controlled cup and spindle arrangement, such as a DV1 low-viscosity viscometer running at 20 rpm at 25° C. with spindle 00.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

In one aspect of the invention the surface tension of the ink is controlled by the addition of one or more surface active materials such as commercially available surfactants. Adjustment of the surface tension of the ink allows control of the surface wetting of the ink on various substrates, for example, plastic substrates. Too high a surface tension can lead to ink pooling and/or a mottled appearance in high coverage areas of the print. Too low a surface tension can lead to excessive ink bleed between different coloured inks. The surface tension is preferably in the range of 20-32 mNm$^{-1}$ and more preferably 21-27 mNm$^{-1}$.

The present invention also provides an ink set comprising a cyan ink, a magenta ink, a yellow ink and a black ink (a so-called trichromatic set), wherein at least one of the inks is an ink according to the present invention. Preferably all of the inks in the ink set are inks according to the present invention. The inks in a trichromatic set can be used to produce a wide range of secondary colours and tones by overlaying the printed dots on white substrate.

The ink set of the present invention can optionally include one or more light colour inks. Light colour versions of any colour ink can be used but preferred colours are light cyan, light magenta and light black. Particularly preferred are light cyan inks and light magenta inks Light colour inks serve to extend the colour gamut and smooth the gradation from highlight to shadow areas of the printed image.

The ink set of the present invention can optionally include one or more of a green ink, an orange ink and a violet ink. These colours further extend the gamut of colours that can be produced. Violet and orange inks are preferred, most preferred is orange ink.

The ink set of the present invention can optionally include a white ink. White ink can be used in two ways. When printing onto a transparent substrate, white ink can be printed over the image such that the image can be viewed from the reverse. Alternatively, white ink can be used to print a base coat onto a coloured substrate before the image is printed.

Even with the range of inks detailed above, some colours can be particularly difficult to produce. Where it is essential that a printed colour is an exact match to a standard, such as a corporate colour, the ink set of the invention can optionally contain one or more inks having matched spot colours, which are designed to be printed in pure form with no overlaying.

The ink of the present invention can produce an image having a high gloss finish. This means that when the ink is printed on a substrate having low gloss, areas of the image that have high deposits of ink (for example where the image has deep colour or dark shading) have a significantly higher gloss level than areas of the image that have low deposits of ink (for example, where there is only light shading in the image). In other words, highlight areas of the print will have a lower gloss level than the shadow areas. Sharp lines can appear in the image where the transitions from heavy to light shading (e.g. from heavy gloss to low gloss) occur, which can lead to unattractive prints.

In order to provide an even finish and therefore improve the image quality, the entire print can optionally be coated with a colourless ink or varnish. Preferably, however, the ink of the invention is printed together with a colourless ink. The ink set of the present invention therefore preferably includes a colourless ink.

The colourless ink is jetted at the same time as the coloured ink of the invention but the colourless ink is deposited in blank or highlight areas of the image that do not have high deposits of coloured ink. This means that the ink film covers the entire printed surface of the substrate, which results in prints with a more even finish across the print. The prints can also tend to have a more even ink film weight across the film, which improves the appearance of the prints because the surface topography is more even and the transitions between the areas of heavy coloured ink deposits to highlights are smoother.

Print heads account for a significant portion of the cost of an entry level printer and it is therefore desirable to keep the number of print heads (and therefore the number of inks in the ink set) low. Reducing the number of print heads can reduce print quality and productivity, however. It is therefore desirable to balance the number of print heads in order to minimise cost without compromising print quality and productivity. One preferred ink set of the present invention comprises a cyan ink, a yellow ink, a magenta ink and a black ink. This limited combination of colours can achieve prints with a very high gloss that is even across the print, very good graduations of tone and a high colour gamut. Further variations of the above ink set can include the above ink set plus either one or more of a clear varnish, a metallic and a white ink. Another example of ink set is a cyan ink, a yellow ink, a magenta ink and a black ink, a colourless ink, a light cyan ink, a light magenta ink and an orange ink When the ink of the present invention is provided in an ink set, the surface tensions of the different inks in the ink set preferably differ by no more than 2 mNm$^{-1}$, more preferably no more than 1 mNm$^{-1}$ and most preferably no more than 0.5 mNm$^{-1}$. Carefully balancing the surface tension of the different inks in this manner can lead to improvements in the quality and appearance of the printed image.

The ink set of the invention can optionally include one or more metallic effect inks. The use of metallic colours such as silver is becoming increasing popular in advertising images, for example.

Conventional solvent-based metallic inks can produce very bright metallic effects. The metallic pigments are in the form of flakes or platelets and these are randomly orientated in the undried liquid ink. In the case of solvent-containing inks, the flakes can align parallel to the print surface as the ink film thickness reduces as a result of solvent loss in the drying process. The alignment of metallic pigment flakes parallel with the print surface results in good reflectivity and metallic lustre. However, the films produced can often have very poor rub properties, which means that the pigment can be easily removed from the print surface. UV cured metallic inks generally have better rub properties but are often dull in appearance because the metallic pigment flakes do not have time to align during the rapid UV curing process.

Metallic inks of the present invention overcome these problems because the inks dry in two stages, as discussed below. During the solvent evaporation step the metallic flakes have time to align, allowing a bright metallic effect to be produced in the final image. However, the UV curing stage yields a rub-resistant film.

Colourless inks according to the present invention may be used as a varnish. In one embodiment of the invention the colourless ink may be used as a varnish for a conventional solvent-based metallic effect ink. Metallic effect prints can be protected with known UV curable varnishes but the high film weight produced when these materials are jetted dulls the metallic lustre of the prints and is deleterious to their appearance. The presence of a relatively large proportion of volatile solvent in the in colourless inks of the present invention allows a low film weight to be deposited, however. Typically a UV varnish would produce a 12 μm film over the surface of the print. By using a colourless ink according to the present invention, the film weight can be reduced to 2 to 3 μm. The low film weight of the hybrid varnish has a far less deleterious affect on the appearance of the metallic print.

The inks of the present invention are primarily designed for printing onto flexible substrates but the nature of the substrate is not limited and includes any substrate which may be subjected to inkjet printing such as glass, metals, plastics and paper. Most preferred are flexible substrates, especially flexible substrates used for the graphic printing industry. Non limiting examples include, polyesters, fabric meshes, vinyl substrates, paper and the like. The inks of the present invention are particularly suited for printing onto self adhesive vinyl and banner grade PVC substrates.

The ink may be prepared by known methods such as stirring with a high-speed water-cooled stirrer, or milling on a horizontal bead-mill.

Printing Apparatus and Method

With conventional solvent-based inks, the printer productivity is governed by the system's ability to expel the bulk solvent. If too much wet ink is laid down on the media, the ink flows to blur the printed image. For this reason, solvents with a high vapour pressure are preferred in the ink. However, if the solvent vapour pressure is too high, ink drying on the printhead nozzle plate may lead to blocked nozzles. This compromise in solvent selection leads to a limitation in productivity.

Because of their lower productivity, the capital cost for solvent printers has to be relatively low to remain commercially viable. The internal mechanisms are therefore kept simple, with as few printheads as possible to produce a reasonable quality image. The low complexity makes these machines easy to operate and maintain.

Over recent years, UV curable ink systems have largely replaced solvent ink printers in the higher productivity range, wide format graphics market. Unlike solvent printers, the ink deposited on the surface does not appreciably evaporate upon heating. Instead, the material is transformed into a solid through exposure to an energy source. In most cases, the energy source is an intense UV light, which causes photo-crosslinking of curable molecules in the presence of a photo-initiator to form a solid.

The greatest perceived benefit of UV curable printers is their ability to deliver high production rates. In most UV printers, the cure source is mounted on the shuttling printhead carriage, on one or both sides of the printhead cluster. In some cases, cure systems are also placed between printheads. With a typical separation distance of less than 100 mm between the print heads and cure unit, the maximum time between print and cure would be 0.1 s for a printhead carriage moving at 1 m/s. UV ink solidification times of less than one second compare favourably with solvent inks that can take several minutes to dry. Inkjet printers for UV curable inks are necessarily more complex and consequently more expensive than inkjet inks printers for solvent-based inks, however.

The ink of the present invention can be printed using inkjet printers that are suitable for use with solvent-based inkjet inks, in combination with a source of actinic radiation.

The features of printers that are suitable for printing solvent-based inkjet inks are well known to the person skilled in the art and include the features described below.

As discussed above, printers suitable for printing solvent-based inkjet inks typically have a low capital cost, which means that the printers tend to have simple internal mechanisms. In practice, this means that inkjet printers suitable for printing solvent-based inks typically comprise gravity feed systems for delivering ink from the ink supply to the printhead. In contrast, UV printers use a pressurised header tank for delivering the ink to the printhead, which allows control of the meniscus position in the nozzle.

Since printheads account for a large proportion of the overall printer cost, inkjet printers suitable for printing solvent-based inkjet inks include the minimum number of printheads that is required to provide a high quality image. In any event, because solvent-based inkjet inks typically require longer to dry than UV inks, there is less advantage in using many printheads to apply large quantities of ink to the substrate because this causes the ink to pool and the image to blur.

Furthermore, printheads that are for printing solvent-based inkjet inks are not provided with a means for heating the ink because solvent-based inks have a low viscosity and do not therefore require heating at the printhead to produce a jettable viscosity (in contrast with UV curable inks). Thus, known solvent-based inks are jetted at ambient temperatures.

Solvent-based inkjet inks are susceptible to drying on the nozzle plate due to evaporation of the solvent. Printers for solvent-based inkjet inks therefore typically include suction cups which can be used to cap the printheads when not in use, allowing a solvent vapour saturated environment to be established, which limits evaporation. Should a printhead become blocked, the suction cup can be used to pull a small volume of ink through the blockage, using a peristaltic pump, to recover performance after excess ink is removed using a wiper blade.

The ink of the present invention comprises both a solvent and a radiation curable component and therefore dries by a combination of evaporation of the organic solvent and curing of the radiation curable component upon exposure to actinic radiation.

The ink of the present invention can surprisingly be used in printers that are suitable for printing conventional solvent-based inkjet inks, provided that a source of actinic radiation is also provided. Typically the printheads of inkjet printers for solvent-based inks are not externally heated. The inks of the present invention can be jetted at ambient temperature, preferably below 35° C., or below 30° C. or about 25° C., and are therefore compatible with the printheads and nozzles that are used to print solvent-based inkjet inks. The use of a printer that is for printing conventional solvent-based inkjet inks, particularly printheads, nozzles and ink delivery systems that are for use with conventional solvent-based inkjet inks, as the basis of the printing apparatus of the invention means that printing apparatus of the invention has a low capital cost.

A printer that is suitable for printing a conventional solvent-based inkjet ink may be adapted before use in printing the inks of the present invention. Depending on the exact nature of the ink and the location of the cure source, opaque ink feed components that are chemically compatible with the ink may be used and/or a UV screen filter film may be applied to the print window on the front of the apparatus. These are minor adaptations that would not have a significant effect on printer cost or performance.

In one embodiment, the printing apparatus of the present invention comprises one or more piezo drop on demand printheads. Preferably the printheads are capable of jetting ink in drop sizes of 50 picoliters or less, more preferably 30 picoliters or less, particularly preferably 10 picoliters or less.

The printing apparatus of the present invention comprises means for evaporating solvent from the ink once the ink has been applied to the substrate. Any means that is suitable for evaporating solvent from known solvent-based inkjet inks can be used in the apparatus of the invention. Examples are well known to the person skilled in the art and include dryers, heaters, air knives and combinations thereof.

In one embodiment, the solvent is removed by heating. Heat may be applied through the substrate and/or from above the substrate, for example by the use of heated plates (resistive heaters, inductive heaters) provided under the substrate or radiant heaters (heater bars, IR lamps, solid state IR) provided above the substrate. In a preferred embodiment, the ink can be jetted onto a preheated substrate that then moves over a heated platen. The apparatus of the invention may comprise one or more heaters.

When printing the ink of the present invention, a significant portion of the solvent is preferably allowed to evaporate before the ink is cured. Preferably substantially all of the solvent is evaporated before the ink is cured. This is achieved by subjecting the printed ink to conditions that would typically dry conventional solvent-based inkjet inks. In the case of the ink of the present invention, such conditions will remove most of the solvent but it is expected that trace amounts of solvent will remain in the film given the presence of the radiation curable component in the ink.

The solvent evaporation step is thought to be important because it is believed to define the image quality. Thus, it is thought that the solvent evaporation step results in a printed image with high gloss, as would be expected for conventional solvent-based inks. Furthermore, the loss of a significant portion of the ink through the evaporation of the solvent leads to the formation of a printed film that is thinner than the film that would be produced by jetting an equivalent volume of known radiation curable ink. This is advantageous because thinner films have improved flexibility.

In order to maximise image quality, and control bleed and feathering between image areas it is preferable to arrest the flow of the ink by evaporating the organic solvent from the ink droplets quickly after they have impacted on the substrate surface, a process often referred to as pinning. To achieve a good quality image it is preferable that the inks are "thermally pinned", that is heated in order to evaporate the organic solvent, within 5 seconds of impact, preferably within 1 second and most preferably within 0.5 seconds.

Unlike standard solvent-based inks, once the solvent has evaporated, the ink is not expected to be fully dry. Rather, what remains on the surface is a high viscosity version of a radiation curable ink. The viscosity is sufficiently high to inhibit or significantly hinder ink flow and prevent image degradation in the timescale that is needed to post-cure the ink. Upon exposure to a radiation source, the ink cures to form a relatively thin polymerised film. The ink of the present invention typically produces a printed film having a thickness of 1 to 20 µm, preferably 1 to 10 µm, for example 2 to 5 µm. Film thicknesses can be measured using a confocal laser scanning microscope.

In one embodiment the source of actinic radiation is positioned downstream from the means for evaporating solvent from the printed ink. In other words the evaporating means and source of actinic radiation are positioned so that printed substrate is exposed to the means for evaporating solvent before it is exposed to radiation, allowing evaporation of the solvent before the radiation curable material is cured.

In this embodiment, the one or more printheads and the radiation source are positioned to create a delay between jetting of the ink onto the substrate and exposure of the printed ink to radiation, to allow for evaporation of the solvent before the ink is cured. Preferably the distance between the one or more printheads and the source of actinic radiation is at least 100 mm, preferably at least 200 mm, and more preferably at least 300 mm.

Preferably the time period between jetting the ink from the printhead onto the substrate and exposing the printed ink to radiation is at least 1 second, preferably at least 5 seconds, and more preferably at least 10 seconds. Typical time periods after jetting for exposure to radiation can range from between 1 to 5 minutes and longer.

The source of actinic radiation can be any source of actinic radiation that is suitable for curing radiation curable inks but is preferably a UV source. Suitable UV sources include mercury discharge lamps, fluorescent tubes, light emitting diodes (LEDs), flash lamps and combinations thereof. One or more mercury discharge lamps, fluorescent tubes, or flash lamps may be used as the radiation source. When LEDs are used, these are preferably provided as an array of multiple LEDs.

Preferably the source of actinic radiation is a source that does not generate ozone when in use.

The source of UV radiation could be situated off-line in a dedicated conveyor UV curing unit, such as the SUVD Svecia UV Dryer. Preferably, however, the source of radiation is situated in-line, which means that the substrate does not have to be removed from the printing apparatus between the heating and curing steps.

The radiation source can be mobile, which means that the source is capable of moving back and forth across the print width, parallel with the movement of the printhead.

In one embodiment, the source of actinic radiation is placed on a carriage that allows the source of actinic radiation to traverse the print width. The carriage is placed downstream of the printer carriage in order to provide a delay between printing of the ink onto the substrate and exposure to the curing unit, allowing the solvent to evaporate before the curing step. In this embodiment the source of actinic radiation moves independently of the printer carriage and movement of the printhead does not therefore have to be slowed in order to provide adequate time for solvent evaporation before the curing step. Thus, overall productivity can be improved.

When the source of radiation is provided on separate carriage, it is necessary to provide an additional carriage rail, motor and control systems. This adaptation can lead to large increases in equipment costs.

Preferably the source of radiation is static. This means that the source does not move backwards and forwards across the print width of the substrate when in use. Instead the source of actinic radiation is fixed and the substrate moves relative to the source in the print direction.

When the source of actinic radiation is provided in the print zone of the printer, light contamination at the printhead, which could lead to premature curing in the nozzle, must be avoided. Adaptations to prevent light contamination, such as lamp shutters, give rise to additional costs. The source of radiation is therefore preferably located outside the print zone of the printing apparatus. By print zone is meant the region of the printing apparatus in which the printhead can move and therefore the region in which ink is applied to the substrate.

A preferred printing apparatus according to the present invention that comprises a static source of radiation located outside the print zone is expected to be economically attractive and therefore suitable for entry level wide format digital graphics use. This embodiment is therefore particularly preferred. By entry level is meant the simplest and cheapest printers that are suitable for wide format digital graphics use.

By locating the source of actinic radiation outside the print zone, and by avoiding the use of mobile radiation sources, potentially expensive adaptations to the printing apparatus can be avoided. Furthermore, as discussed above, the separation of the print and curing zones is beneficial for printing the ink of the present invention because this allows solvent to evaporate from the printed ink before the ink is cured by exposure to the radiation source.

Static curing units preferably span the full print width, which is typically at least 1.6 m for the smaller wide format graphics printers.

Fluorescent tubes, mercury discharge lamps, and light emitting diodes can be used as static curing units.

High and medium pressure mercury discharge lamps can be relatively expensive to operate. The lamp units themselves can be heavy and expensive and often additional shielding is required to prevent unintentional UV exposure to the operator. Extraction is also required to remove ozone that is produced by the lamps. Furthermore, where high discharge currents are involved for high output lamps, electronic ballast is required because the resistance of the gas used in the lamp changes during use. High and medium pressure mercury discharge lamps are not therefore preferred UV sources according to the present invention.

LED sources that are currently available are relatively expensive and a printing apparatus comprising a LED source of UV radiation is unlikely to be suitable for use an entry level printer. Thus, a source of actinic radiation comprising currently available LEDs is not preferred. However, development of UV LED sources for curing inks is ongoing and it is envisaged that the cost of LED sources will decrease significantly in the future. In this case, a printing apparatus according to the present invention that includes a source of actinic radiation comprising LEDs would be suitable for entry level printing systems.

In one embodiment of the invention, the source of radiation comprises a UV fluorescent lamp.

In another embodiment of the invention the source of radiation comprises one or more flash lamps. Flash lamps operate by discharge breakdown of an inert gas, such as xenon or krypton, between two tungsten electrodes. Unlike mercury discharge lamps, flash lamps do not need to operate at high temperature. Flash lamps also have the advantage of switching on instantaneously, with no thermal stabilisation time. The envelope material can also be doped, to prevent the transmission of wavelengths that would generate harmful ozone. Flash lamps are therefore economical to operate and therefore suitable for use in entry level printers.

Flash lamps can be operated in a number of modes, including cold pulse mode and modulation mode. Cold pulse mode is when the lamp output is switched on for a very brief period from fully off every time a flash of UV radiation is required. Normally, the intermittent nature of cold pulsing a flash lamp would exclude its applicability to conventional curing applications, where it is usual to require a constant lamp output. However, when a flash lamp is used to cure the inkjet ink of the present invention downstream from the print zone, the intermittent nature of the cure source does not have a detrimental affect. For example, while the average production speed of a printer for solvent-based inkjet inks is typically 0.5 m/min, the motion of the substrate through the printer actually occurs in steps of 3-6 mm, at the end of each printhead carriage pass. This means that the substrate is static for between 1-3 seconds at a time, which is more than sufficient time for the lamp to flash at high power several times over the same image region in order to cure the ink. Provided that the lamp is triggered in synchronicity with the substrate advancement steps, the pulsed nature of the lamp output is capable of providing sufficient dose and peak irradiance to cure the ink, while not leading to thermal damage of the substrate.

When operating in this mode flash lamps do not emit constant radiation when in use and are therefore "off" for a significant proportion of the time in which the lamp is over the substrate, which reduces the risk of thermally damaging temperature-sensitive substrates.

The circuit elements required to create the voltage pulse to drive the flash lamp are relatively cheap, consisting of an AC-DC converter, high voltage capacitor and inductor. The simplicity and considerably lower average power consumption than the mercury discharge lamp make the capital and running costs for this lamp economical for use in the entry level hybrid solvent/UV printer.

The flash lamp is preferably operated in modulation mode, however. In modulation mode large instantaneous UV power output is achieved during pulses, but the lamp lifetime is extended because repeat triggering of the gas discharge is not required. Modulation also has the benefit that, between pulses, there is relatively low current flowing in the lamp which enhances the infra red (IR) output of the lamp. Since the absolute power between pulses is low, the lamp will act as a low power IR heater that assists with solvent removal from the printed ink.

Flash lamps typically require cooling during use and the maximum average power output of the flash lamp depends on the cooling method used. For higher power outputs, more sophisticated cooling methods are required. If convective air cooling is used the maximum average power output is around 0-15 W/cm$^2$, if forced air cooling is used the maximum average power output is around 15-30 W/cm$^2$ and if water cooling is used the maximum average power output is around 30-60 W/cm$^2$. While it is preferable to maximise the lamp's power output in order to achieve rapid ink curing, when providing an economical source of UV radiation this requirement has to be balanced with the cost of providing an appropriate cooling means. The provision of a recirculating water cooler adds significantly to the cost and is therefore unlikely to be suitable for use in entry level printers. The maximum average power output of the flash lamp is therefore preferably about 30 W/cm$^2$ and the lamp is preferably cooled using a forced air cooling system.

The UV output of the flash lamp can be enhanced compared to the IR output by providing a high current density. This can be achieved by increasing the power output of the lamp. The power output of the lamp is proportional to the lamp's internal diameter and enhancement of the UV output compared to the IR output can therefore be achieved by using a large internal diameter lamp with a large power supply. For example, a lamp internal diameter of around 10 mm would be capable of producing 94 W/cm, compared to 38 W/cm for a 4 mm internal diameter lamp Using a single 1.6 m long flash lamp with an internal diameter of 10 mm would require a power supply capable of providing over 15 kW. Despite the simplicity of construction, a power supply of this magnitude could still be expensive and may need a three phase power connection. The source of radiation is therefore preferably formed from a series of shorter lamps that extend along the print width with a smaller power supply that switches between them. The passage of the printed substrate through printing apparatus is preferably relatively slow and the lamps can therefore be rapidly pulsed in sequence across the full print width before the substrate advances. Since the image quality provided by a hybrid solvent/radiation curable inkjet ink is thought to be defined by solvent removal stage, the slightly different exposure times experienced by the print across its width are not expected to have an impact on image quality.

FIG. 1 shows a perspective view of an exemplary embodiment of an inkjet printing apparatus according to the present invention. The apparatus includes a printer head (1), a heating unit (2) and a UV curing unit (3).

Figure 2:
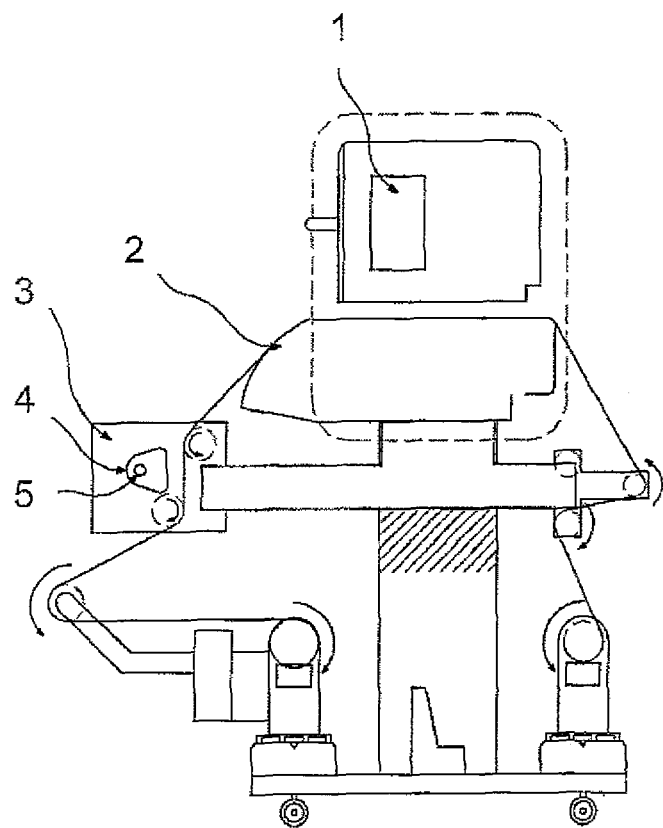
FIG. 2 shows a section view of an exemplary embodiment of an inkjet printing apparatus according to the present invention.

FIG. 2 shows a section view of an exemplary embodiment of an inkjet printing apparatus according to the present invention. The apparatus includes a print carriage including a print head (1), heating unit(s) (2), a UV curing unit (3) comprising a reflector (4) and a bulb (5).

In one particularly preferred embodiment of the present invention the source of actinic radiation is a low pressure mercury lamp.

Accordingly, the present invention also provides a method comprising:
i) inkjet printing an inkjet ink of the present invention on to a substrate;
ii) evaporating solvent from the ink; and iii) exposing the ink to UV radiation from a low pressure mercury lamp.

In the method according to this embodiment the inkjet ink preferably comprises at least 30% by weight of organic solvent based on the total weight of the ink, a radiation curable oligomer, a photoinitiator and optionally a colourant.

Preferably, the radiation curable oligomer is present in the composition in an amount of 2 to 65% based on the total weight of the ink, more preferably 2% to 45% by weight, more preferably 5 to 35% by weight, more preferably 8 to 25% by weight, and most preferably 10% to 25% by weight.

The radiation curable oligomer used according to this embodiment preferably has a molecular weight of 500 g/mol or more.

As discussed previously, the ink of the present invention may comprise one or more in monomers with a molecular weight of 450 or less. Although monofunctional monomers may be used, di, tri and higher functionality monomers are preferred for use in this embodiment The ink used according to this preferred embodiment may comprise less than 20% by weight of radiation curable material having a molecular weight of less than 450 g/mol based on the total weight of the ink, or less than 10% by weight, more preferably less than 5% by weight. In a particularly preferred embodiment, the ink is substantially free of radiation curable material having a molecular weight of less than 450.

The ink used according to this preferred embodiment may comprise less than 20% by weight of radiation curable material having a molecular weight of less than 600 based on the total weight of the ink, or less than 10% by weight, more preferably less than 5% by weight. In a particularly preferred embodiment, the ink of the invention is substantially free of radiation curable material having a molecular weight of less than 600.

Other preferred features of the inks that can be used according to this preferred embodiment are as described above for the inks of the invention.

Medium pressure mercury lamps are used widely in the printing industry to achieve UV cure of inks designed for a range of applications. Medium pressure mercury lamps are relatively inefficient with typically only 15% of the energy input converted to the desired UV radiation; the remainder of the input energy is converted to infrared radiation/heat and visible light. The high heat output of medium pressure mercury lamps can lead to problems with degradation or distortion of heat sensitive substrates used for some printing applications. One solution is to use dichroic reflectors that channel heat away from the substrate, focussing only the UV radiation onto the material. These however limit the efficacy of the lamp and add considerably to the cost.

Low pressure mercury lamps are much more efficient than medium pressure mercury lamps. Approximately 35% of the energy input is converted to UV radiation, 85% of which has a wavelength of 254 nm (UVC). These lamps therefore generate less heat in use than medium pressure mercury lamps, which means that they are more economical to run and less likely to damage sensitive substrates. Furthermore, low pressure mercury lamps can be manufactured in such a way as not to generate ozone in use and are therefore safer to use than medium pressure mercury lamps.

Although low pressure mercury lamps are used extensively in the water purification industry, they have not yet found widespread application in the printing industry. Typical medium pressure mercury lamps have an output in the range of 80 to 240 W/cm. In contrast, the maximum output for low pressure mercury lamps is around 30 to 440 mW/cm, which means that the peak irradiance of low pressure mercury lamps is also low. The low power output and low peak irradiance of these lamps suggests that they would not provide effective curing of radiation curable inkjet inks.

It has surprisingly been found that low pressure mercury lamps can be used to cure the inkjet inks according to the present invention, particularly inkjet inks of the present invention that comprise a radiation curable oligomer.

In this preferred embodiment of the present invention, the ink is cured by exposing the ink to UV radiation from a low pressure mercury lamp. A single low pressure mercury lamp or two or more low pressure mercury lamps can be used.

The IUPAC Compendium of Chemical Terminology (PAC, 2007, 79, 293 "Glossary of terms used in photochemistry", 3rd edition (IUPAC Recommendations 2006), doi:10.1351/pac200779030293) describes a low pressure mercury lamp as a: "resonance lamp that contains mercury vapour at pressures of about 0.1 Pa ($0.75 \times 10^{-3}$ Torr; 1 Torr=133.3 Pa). At 25° C., such a lamp emits mainly at 253.7 and 184.9 nm. They are also called germicidal lamps. There are cold- and hot-cathode as well as cooled electrodeless (excited by microwaves) low-pressure mercury lamps. The Wood lamp is a low-pressure mercury arc with an added fluorescent layer that emits in the UV-A spectral region (315-400 nm)."

Low pressure mercury lamps are used extensively in the water purification industry and are therefore widely available.

As mentioned above, low pressure mercury lamps predominantly emit UV radiation with a peak wavelength of around 254 nm but the wavelength of the radiation can be varied by coating the internal surface of the lamp with a phosphor. In a preferred embodiment of the lamp, there is no such phosphor coating. In the method of the present invention the lamp preferably emits radiation with a peak wavelength of around 254 nm, or put another way, the natural or unaltered wavelength of radiation emitted by mercury vapour in a low pressure lamp environment.

The use of a phosphor coating can lead to a reduction in lamp luminous efficiency. The preferred phosphor-free lamps used according to the invention have an efficiency exceeding 45% for UVC generation, however. This high efficiency helps to minimise the cure unit running costs.

In low pressure mercury lamps the UV output varies with temperature. When the lamp is first switched on the liquid mercury starts to vaporise and as the temperature increases, the vapour pressure of the mercury reaches an optimum level and the output of UVC radiation reaches a maximum. As the temperature of the lamp increases further the vapour pressure continues to rise, reducing the UVC output. Low pressure mercury lamps are therefore operated at an optimum temperature at which maximum UVC output can be achieved and this temperature is typically around 25-40° C. for standard low pressure lamps. This limit on the operating temperature limits the energy input, however, because the lamp temperature can be raised above the optimum temperature if the energy input is too high. Limiting the energy input limits the maximum UV output achievable. The maximum UV output achievable from a low pressure mercury lamp is therefore limited by the operating temperature and the energy input. Standard low pressure mercury lamps have linear power densities of less than 380 mW/cm in their normal configuration. However, U shaped lamps can have effective total power densities of up to twice this, for example 650 mW/cm.

Although the UVC output of standard low pressure mercury lamps is sufficient to cure the inks of the current invention within an acceptable time frame, the UVC cure dose is preferably delivered over a shorter time period, allowing faster cure speeds.

Figure 3:
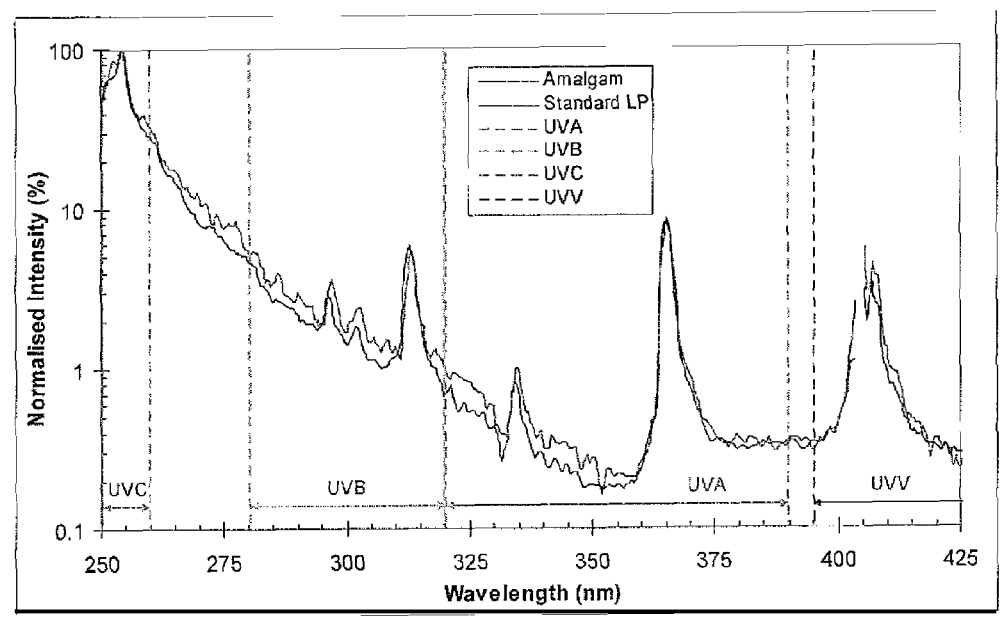
FIG. 3 shows the spectral output of a mercury amalgam lamp compared with a conventional low pressure mercury lamp.

In a preferred embodiment of the invention, the low pressure mercury lamp is an amalgam lamp. In amalgam lamps an amalgam of mercury, typically with bismuth and/or indium, is used instead of liquid mercury. Other suitable materials that are compatible with, or are capable of forming an amalgam with mercury could be used instead of bismuth or indium, however. Amalgam lamps have the same spectral output as conventional low pressure mercury lamps, as shown in FIG. 3. In operation, the amalgam gradually releases mercury vapour as the temperature increases, but vapour is reabsorbed if the pressure becomes too high. This self-regulation means that the optimum mercury vapour pressure is achieved at a higher temperature, approximately 80-160° C., for example 83° C., depending on the type of lamp and manufacturer. Amalgam lamps therefore operate at a higher optimum temperature than standard low pressure mercury lamps, which means that higher energy inputs can be tolerated. A higher energy input leads to an accompanying increase in UVC output, which remains stable during extended operation of the lamp.

Typically, amalgam lamps can run at temperatures up to 140° C. with linear power densities exceeding 380 mW/cm and such lamps can achieve outputs that equate to approximately five times the output of a conventional low pressure mercury lamp. The combination of the increased radiation and heat generated by the amalgam lamp offers a useful advantage in drying and curing the inks used in the present invention when compared to regular low pressure mercury lamps.

In an embodiment of the invention the cure lamp linear power density is below 2000 mW/cm, preferably 200 mW/cm to 1500 mW/cm, more preferably 380 mW/cm to 1,500 mW/cm. In a more preferred embodiment the linear power density is 380 mW/cm to 1,200 mW/cm and in a most preferred embodiments either 380 to 1000 mW/cm or 500 to 1000 mW/cm.

Standard low pressure mercury lamps have current densities not exceeding 0.45 Amps/cm whereas amalgam lamps have current densities above this level.

The temperature of the amalgam lamp may be controlled in order to allow the optimal UV light output to be maintained. Temperature control can be achieved by immersing the lamp in water within a quartz sleeve. As well as providing electrical insulation against the water, the air gap around the lamp prevents overcooling by the water. By controlling the water flow past the lamps, the optimal lamp temperature can be maintained for maximum UV output. While convenient, this method is not preferred as it incurs the additional cost of a chiller.

In a preferred embodiment air is blown across the low pressure mercury lamp(s) to control the lamp temperature. In a further preferred embodiment, forced air that has been warmed by the lamp(s) is directed over the surface of the printed image to aid removal of the solvent prior to curing. For example, one or more fans can be positioned at the rear of the lamp reflector in order to extract and transport excess warm air upstream in the print process to assist in drying and pinning the printed image, thus increasing efficiency of the printer.

The low pressure mercury lamp is preferably used together with auxiliary ballast electronics in order to regulate the current through the lamp. Many types of ballast are available. Preferred for use in this invention are electronic ballasts that convert input mains frequency to frequencies greater than the relaxation time of the ionised plasma in the lamp, thereby maintaining optimal light output.

In a more preferred embodiment, an electronic ballast operating in rapid or instant start mode is provided wherein electrodes of the low pressure mercury lamp may be pre-warmed before ignition in order to reduce electrode damage caused by frequent switching. Though more expensive to implement than cold-start methods, pre-heating is preferred because the preferred amalgam lamp of the present invention is high power, operates at high temperature and in use is likely to be frequently switched.

Low pressure mercury lamps emit light in all directions. For efficient UV curing of printed images, the lamp is therefore preferably used in conjunction with at least one reflector to ensure that the majority of emitted UV light is efficiently directed to the printed surface. The reflector is preferably made of a material that efficiently reflects the UV light with minimal loss, for example aluminium, which has a reflective efficiency of greater than 80%. To prevent hazing of the mirror finish during long term UV exposure, pre-anodised aluminium is preferred, such as 320G available from Alanod. This material is easily formed into curved or faceted shapes by rolling or bending to provide efficient reflectors.

Figure 4:
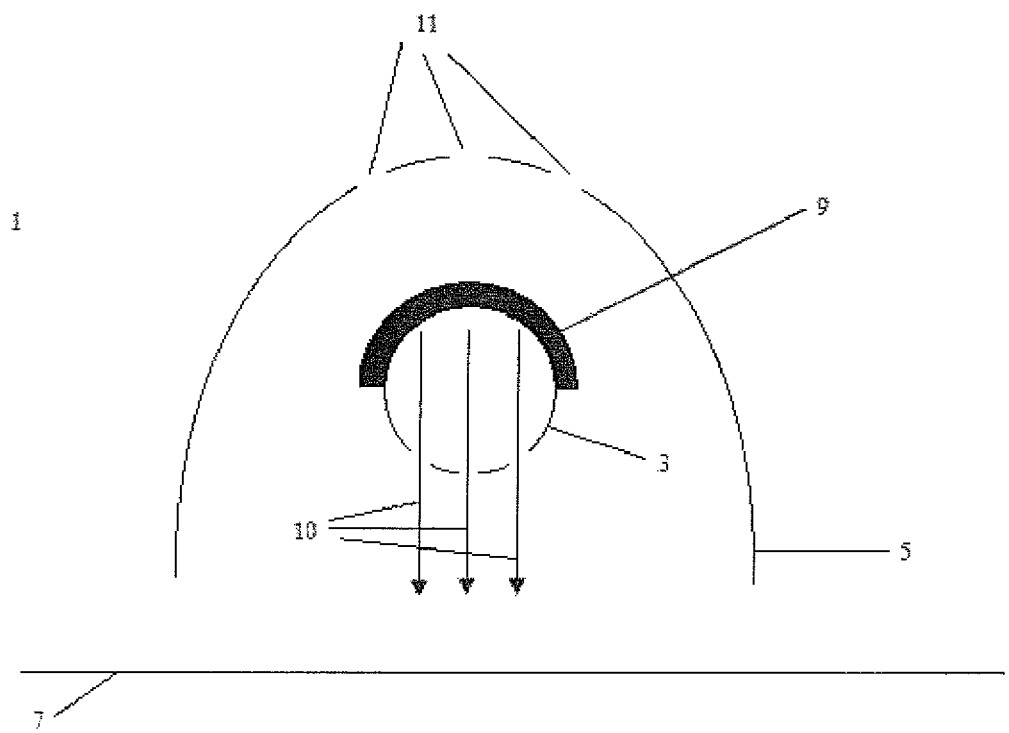
FIG. 4 shows a section view of a low pressure mercury lamp provided with a reflective coating.

In one embodiment the reflector preferably has en elliptical shape such that the radiation directed at the printed substrate is focussed to a narrow line, thereby increasing the peak irradiance at the printed substrate. "Elliptical reflector" is a term known in the art and refers to a reflector having a general shape as shown in FIG. 4.

The finite diameter of the low pressure mercury lamp prevents all of the emitted light from originating at the focus of the ellipse. In a preferred embodiment low pressure mercury lamps with diameter below 30 mm, preferably below 20 mm and more preferably below 10 mm are therefore used in combination with an elliptical reflector, in order to increase the peak irradiance at the substrate even further.

In one embodiment, the bulb of the low pressure mercury lamp is partially coated with a reflective coating such that the radiation produced by the bulb is directed towards the print surface. FIG. 4 is a section view of a low pressure mercury lamp that is provided with a reflective coating. The lamp (1) comprises a bulb (3) that produces the UV radiation. The bulb is mounted within a reflector (5). The bulb surface that is orientated away from the print surface (7) is coated with a reflective coating (9), which directs radiation (10) emitted from the bulb towards the print surface (7) and therefore improves lamp efficiency. Furthermore, the presence of the reflective coating allows gaps (11) in the reflector (5) to be provided, allowing cooling of the lamp. The reflective material can be any material that reflects UVC radiation, and the coating can be can be applied by painting or vacuum deposition, for example.

The total UV dose received by the ink printed on the substrate is inversely proportional to the speed that the substrate moves past the lamp. Although the low pressure mercury lamps used according to the preferred embodiment of the present invention have a relatively low power output when compared to medium pressure mercury lamps, the use of a static lamp allows the printed ink to be exposed to the radiation from the lamp for longer periods than are achieved with traditional scanning type large format printers. Hence, the total dose provided by the low pressure lamps can exceed that provided by scanning type cure units using higher output lamps.

The envelope of a low pressure mercury lamp is typically made from fused quartz, which allows production of lamps with lengths exceeding one meter. To ensure even curing across the full print width using a static in-line cure unit, it is preferable to provide a lamp with an arc length exceeding the print width by several centimeters to counter the emission variance near the electrodes. Together with the electrode encapsulation, the final lamp length could approach 3 m in some cases. This length of lamp is achievable for envelopes with a wide diameter. However, narrower lamps would be more fragile and require additional support along their length, which could interfere with the irradiance profile. In this case, it may be preferable to use several smaller lamps in a castellated or staggered arrangement to achieve full width curing.

The present invention provides a method of inkjet printing using the printing apparatus and inks as described above.

The present invention further provides an inkjet ink cartridge containing an inkjet ink as defined herein. The cartridges comprise an ink container and an ink delivery port which is suitable for connection with an inkjet printer.

The invention will now be described with reference to the following examples, which are not intended to be limiting.

EXAMPLES i) Coloured Inks

Black, cyan, magenta and yellow free radical curing inkjet ink formulations (Examples 1 to 12), a magenta cationic curing inkjet ink (Example 13) and comparative cyan, magenta, yellow and black inkjet ink formulations (Comparative Examples 1 to 4) having the compositions shown in Tables 1 to 4 were prepared by mixing the components in the given amounts. Amounts are given as weight percentages based on the total weight of the ink.

UVE2500-TP20 is an epoxy novolac acrylate oligomer available from Polymer Technologies, Nippon Gohsei 7630B is a hexafunctional urethane acrylate with a viscosity of 6.9 Pa·s at 60° C., Tegoglide 410 is a polyether siloxane copolymer slip aid available from Evonik, Epikote 1001 is a bisphenol A diepoxide oligomer, OXT221 is difunctional oxetane monomer, and Elvacite 2013 is an acrylic copolymer resin.

Optical density was measured using a GretagMacbeth SpectroEye Spectrophotometer.

TABLE 1

|  | Ex. 1 black | Ex. 2 cyan | Ex. 3 magenta | Ex. 4 yellow | Ex. 5 black | Ex. 6 cyan | Ex. 7 magenta | Ex. 8 yellow |
|---|---|---|---|---|---|---|---|---|
| Diethylene glycol diethyl ether | 45.37 | 44.37 | 45.38 | 46.27 | 45.0 | 45.3 | 43.3 | 44.3 |
| Propylene carbonate | 26.48 | 26.48 | 22.18 | 24.19 | 26.5 | 26.7 | 25.5 | 26.0 |
| UVE2500-TP20 | 19.12 | 17.12 | 15.76 | 10.11 | — | — | — | — |
| Nippon Gohsei 7630B | — | — | — | — | 16.5 | 16.0 | 14.0 | 10.3 |
| Tegoglide 410 | 0.03 | 0.03 | 0.03 | 0.03 | — | — | — | — |
| Isopropyl thioxanthone | 1.0 | — | — | — | — | — | — | — |
| Irgacure 369 | 2.00 | — | — | — | — | — | — | — |
| Irgacure 819 | — | 4.0 | 4.0 | 4.0 | 4.0 | 4.0 | 4.0 | 4.0 |
| Irgacure 2959 | — | 2.0 | 2.0 | 2.0 | 2.0 | 2.0 | 2.0 | 2.0 |
| Cyan pigment dispersion | — | 6.0 | — | — | — | 6.0 | — | — |
| Yellow pigment dispersion | — | — | — | 13.4 | — | — | — | 13.4 |
| Magenta pigment dispersion | — | — | 10.65 | — | — | — | 11.2 | — |
| Black pigment dispersion | 6.0 | — | — | — | 6.0 | — | — | — |
| Viscosity/mPa·s | 6.16 | 6.26 | 6.16 | 6.28 | 5.92 | 6.03 | 5.88 | 6.09 |
| Optical density | 1.93 | 1.49 | 1.43 | 0.88 | 2.06 | 1.72 | 1.52 | 1.27 |

TABLE 2

|  | Ex. 9 black | Ex. 10 cyan | Ex. 11 magenta | Ex. 12 yellow |
|---|---|---|---|---|
| Diethylene glycol diethyl ether | 32.5 | 33.2 | 32.8 | 32.4 |
| Propylene glycol propyl ether | 20.0 | 20.0 | 20.0 | 20.0 |
| Gamma butyrolactone | 16.5 | 16.3 | 15.5 | 16.4 |
| Nippon Gohsei 7630B | 18.5 | 18.0 | 14.0 | 11.3 |
| Irgacure 819 | 4.0 | 4.0 | 4.0 | 4.0 |
| Irgacure 2959 | 2.0 | 2.0 | 2.0 | 2.0 |
| Cyan pigment dispersion |  | 6.0 |  |  |
| Yellow pigment dispersion |  |  |  | 13.4 |
| Magenta pigment dispersion |  |  | 11.2 |  |
| Black pigment dispersion | 6.0 |  |  |  |
| UV12 stabiliser | 0.5 | 0.5 | 0.5 | 0.5 |

TABLE 3

|  | Example 13 Light magenta |
|---|---|
| Diethylene glycol diethyl ether | 36.97 |
| Propylene carbonate | 23.73 |
| Epikote 1001 | 7.46 |
| OXT221 | 21.84 |
| Esacure 1064 | 8.0 |
| Magenta pigment dispersion | 2.0 |

TABLE 4

|  | Comparative example 1 Cyan | Comparative example 2 Magenta | Comparative example 3 Yellow | Comparative example 4 Black |
|---|---|---|---|---|
| Diethylene glycol diethyl ether | 52.99 | 48.84 | 51.4 | 50.4 |
| Propylene carbonate | 35.35 | 32.56 | 33.4 | 33.57 |

TABLE 4-continued

|  | Comparative example 1 Cyan | Comparative example 2 Magenta | Comparative example 3 Yellow | Comparative example 4 Black |
|---|---|---|---|---|
| Elvacite 2013 | 6.74 | 5.35 | 5.51 | 6.00 |
| Tegoglide 410 | 0.03 | 0.03 | 0.03 | 0.03 |
| Cyan pigment dispersion | 4.89 | — | — | — |
| Magenta pigment dispersion | — | 13.22 | — | — |
| Yellow pigment dispersion | — | — | 9.66 | — |
| Black pigment dispersion | — | — | — | 10.0 |

The inks of Examples 1 to 8, 13 and Comparative Example 1 were drawn down onto self adhesive vinyl substrate (Profiscreen, Igepa) using a no 2 Kbar, depositing a wet film weight of 12 microns. The ink films were dried in an oven at 60° C. for three minutes. The dried films of Examples 1 to 8 and 13 were exposed to UV radiation HI using a conveyorised drier running at 20 meters per minute fitted with two 80 W/cm medium pressure mercury lamps.

The relative solvent resistance of the cured prints was assessed by rubbing with a soft cloth soaked in isopropyl alcohol. The number of double rubs required to break through to the substrate being recorded in each case (100 maximum). The results are shown in Table 5.

TABLE 5

| Example | Number of double IPA rubs to break through film |
|---|---|
| 1 | 85 |
| 2 | 100 |
| 3 | 70 |
| 4 | 100+ |
| 5 | 100+ |
| 6 | 100+ |
| 7 | 50 |
| 8 | 50 |
| 13 | 40 |
| Comparative example 1 | 3 |

The inks of Examples 1 to 4 and Comparative Examples 1 to 4 were printed on a self adhesive vinyl substrate (IMA-Gin™ JT5929P, MACtac®) using a Maxjet 220 printer, supplied by Mutoh. Primary colours were achieved by printing the inks of Examples 1 to 4 and Comparative Examples 1 to 4 in a single layer. Secondary colours were achieved by overlaying a second colour on a first colour (see Table 6). Printing and thermal drying details are shown below:

Mode:
Print Mode: 540×720 DPI 4-Pass Var.
Heads: 1234
Dotsize: Normal (SML)
Height: Middle
Mode: Sign/Quality
Scan width: Data
Overprint: 1
Vacuum: Normal
Bidi: Selected
Distance: 0
Thickness: 210
Interval: 0
Screen: Speed Screen The following heater settings were used for all of the print samples:

| Pre-heater, A | 50° C. |
|---|---|
| Fixer, B | 40° C. |
| Post-fixer, C | 50° C. |
| Dryer, D | 50° C. |

After thermal drying, the inks of Examples 1 to 4 were exposed to ultraviolet light using a Svecia conveyorised cure unit fitted with one 80 W/cm medium pressure mercury lamp. The samples were cured at 10 m/minute belt speed.

Inks were assessed for isopropyl alcohol resistance as described above.

Gloss was measured using a Tri-Glossmaster 20/60/85 available from Sheen instruments. The gloss was determined from both 20 degree and 60 degree angle.

The results are shown in Table 6.

TABLE 6

|  | Colour |  | Gloss 60° | Gloss 20° | Number of double IPA rubs to break through film |
|---|---|---|---|---|---|
| Examples 1-4 | Cyan | Primary colours (100%) | 92.8 | 74.2 | 51 |
|  | Magenta |  | 110.0 | 107.0 | 24 |
|  | Yellow |  | 100.0 | 73.0 | 52 |
|  | Black |  | 94.2 | 87.5 | 63 |
|  | Cyan + Yellow | Secondary colours (200%) | 94.9 | 87.7 | 59 |
|  | Magenta + Yellow |  | 108.0 | 110.0 | 64 |
|  | Cyan + Magenta |  | 104.0 | 108.0 | 99 |
|  | CMY + black |  | 94.4 | 88.1 | 62 |
| Comparative examples 1-4 | Cyan | Primary colours (100%) | 61.9 | 22.8 | 3 |
|  | Magenta |  | 82.1 | 36.7 | 3 |
|  | Yellow |  | 78.7 | 34.4 | 4 |
|  | Black |  | 89.5 | 40.4 | 3 |
|  | Cyan + Yellow | Secondary colours (200%) | 81.0 | 35.4 | 3 |
|  | Magenta + Yellow |  | 96.7 | 62.6 | 4 |
|  | Cyan + Magenta |  | 93.2 | 53.1 | 4 |
|  | CMY + black |  | 91.9 | 42.3 | 4 |

As can be seen from the above results, the inks of the examples offer improved solvent resistance and higher gloss compared to the existing technology-based compositions.

ii) Colourless Varnish

A colourless inkjet ink formulation (Example 14), having the composition shown in Table 7 was prepared by mixing the components in the given amounts. Amounts are given as weight percentages based on the total weight of the ink.

Etermer 6146 is a hexafunctional aliphatic urethane acrylate oligomer available from Eternal resins.

TABLE 7

|  | Example 14 |
|---|---|
| Diethylene glycol diethyl ether | 44.4 |
| Propylene carbonate | 25.6 |
| Etermer 6146 | 27.0 |
| Irgacure 819 | 2.0 |
| Irgacure 2959 | 1.0 |
| Viscosity | 6.07 mPa · s |

A solvent-based silver colour metallic ink (Jetfluid® silver from Eckart) was printed on Mactac JT5929P self adhesive vinyl substrate using a Mutoh Valuejet VJ 1304 E printer and allowed to dry. The colourless ink of Example 14 was drawn down onto the printed metallic ink using a 12 micron number 2 K bar. The film was dried at 60° C. for 3 minutes before being UV cured using two 80 W/cm medium pressure mercury lamps at a belt speed of 20 meters per minute.

The resistance to isopropyl alcohol was assessed for both the varnished metallic print and an unvarnished metallic print. A soft cloth was soaked in isopropyl alcohol and the number of double rubs required to remove the metallic film was noted in each case. The dry rub resistance, or ease of removal of metallic pigment from the surface, was assessed by rubbing the print with a soft cloth (1 double rub) and observing the transfer of silver colour to the cloth. The results are shown in Table 8, below.

TABLE 8

| | Number of double IPA rubs to remove metallic print | Dry rub resistance |
| --- | --- | --- |
| Unvarnished print | 1 | Significant transfer of silver colour to cloth |
| Varnished print | 25 | No transfer of silver colour to cloth |

The application of the varnish was found to have significantly increased the solvent resistance and dry rub resistance of the metallic ink. Furthermore, the varnish had only a minimal effect on the metallic lustre of the print.

iii) Low Pressure Mercury Lamp

Cyan inkjet ink formulations according to the invention (examples 15 and 16), and a comparative cyan inkjet ink formulation (comparative example 5) having the compositions shown in Tables 9 and 10 were prepared by mixing the components in the given amounts.

UVE2500 is novolac acrylate oligomer with a molecular weight of 640 g/mol, Etercure 6146-100 is an aromatic hexafunctional urethane acrylate with a molecular weight of 770 g/mol, hexanediol diacrylate has a molecular weight of 226 g/mol, dipropylene glycol diacrylate has a molecular weight of 252 g/mol, Sartomer CN964 A85 is a blend of 85% urethane acrylate oligomer with a molecular weight 3700 g/mol and tripropylene glycol diacrylate with a molecular weight of 300 g/mol.

TABLE 9

| | Example 15 | Example 16 |
| --- | --- | --- |
| UVE2500 (100% solid) | 16.17 | — |
| Etercure 6146-100 | — | 21.00 |
| Propylene carbonate | 26.59 | 25.0 |
| Diethylene glycol diethyl ether | 45.24 | 42.00 |
| Irgacure 819 | 4.0 | 4.0 |
| Irgacure 2959 | 2.0 | 2.0 |
| Cyan pigment dispersion * | 6.0 | 6.0 |

TABLE 10

| Comparative example 5 | |
| --- | --- |
| Hexanediol diacrylate | 38.7 |
| Dipropylene glycol diacrylate | 38.7 |
| Firstcure ST1 | 0.8 |
| Sartomer CN964 A85 | 9.7 |
| Irgacure 819 | 4.0 |

TABLE 10-continued

| Comparative example 5 | |
| --- | --- |
| Irgacure 2959 | 2.0 |
| Byk 307 | 0.1 |
| Cyan pigment dispersion * | 6.0 |

The inks of examples 15 and 16 and comparative example 5 were drawn down onto self adhesive vinyl substrate (Mactac Imagin JT5929P) using a number 2 K bar depositing a wet film of 12 microns. The ink prints of examples 15 and 16 were oven dried at 60° C. for 3 minutes. The inks were then exposed to a low pressure mercury lamp with a wavelength of 254 nm (supplied by UV Systems Inc) for 1 minute at a distance of 1 cm.

The inks were tested for degree of cure and solvent resistance as described below. The tests were conducted on the ink films before and after exposure to the low pressure mercury lamp and the results are shown in Table 11.

Degree of Cure Test

The ink films were assessed for degree of cure and given a rating as shown below.

5=Film fully dry and cannot be removed by finger nail scratch
4=Film dry but surface is soft and easily marked
3=Film is dry but soft and can be scratched off by finger nail
2=Partially cured film but can be smeared from substrate
1=No change in film properties after exposure, film wet IPA Resistance Test The ink films were rubbed with a soft cloth soaked in isopropyl alcohol. The number of double rubs for initial colour removal and then for film failure were noted.

TABLE 11

| | Film properties before exposure | | | Film properties after exposure | | |
| --- | --- | --- | --- | --- | --- | --- |
| | | IPA resistance | | | IPA resistance | |
| Ink | Degree of cure | Colour removal | Film failure | Degree of cure | Colour removal | Film Failure |
| Example 15 | 1 | 1 | 1 | 5 | 30 | 30 |
| Example 16 | 1 | 1 | 1 | 5 | 100+ | 100+ |
| Comparative example 5 | 1 | 1 | 1 | 1 | 1 | 1 |

As can be seen from Table 11, the inks of examples 15 and 16 both cured well after exposure to the low pressure mercury lamp, giving dry films with good resistance to isopropyl alcohol. However, the ink of comparative example 5 did not exhibit any apparent change in ink film properties upon exposure to the low pressure mercury lamp, indicating that the ink had not cured.

Whilst not wishing to be bound by theory, it is believed that the presence of a radiation curable oligomer in the inkjet ink reduces the number of unsaturated bonds that must be polymerised in order to yield a solid ink film. This means that the ink can be cured with a relatively low dose of UV, which can be achieved using a low pressure mercury lamp.

To investigate this further, comparative examples 6 to 8 were prepared in which the monomeric components in comparative example 5 were partially replaced with Sartomer CN964 A85. The compositions and viscosities of the inks of comparative examples 5 to 8 are shown in Table 12.

TABLE 12

| Component | Comparative example 5 | Comparative example 6 | Comparative example 7 | Comparative example 8 |
|---|---|---|---|---|
| Hexanediol diacrylate | 38.7 | 28.6 | 18.55 | 8.55 |
| Dipropylene glycol diacrylate | 38.7 | 28.6 | 18.55 | 8.55 |
| Firstcure ST1 | 0.8 | 0.8 | 0.8 | 0.8 |
| Sartomer CN964 A85 | 9.7 | 29.9 | 50.0 | 70.0 |
| Irgacure 819 | 4.0 | 4.0 | 4.0 | 4.0 |
| Irgacure 2959 | 2.0 | 2.0 | 2.0 | 2.0 |
| Byk 307 | 0.1 | 0.1 | 0.1 | 0.1 |
| Cyan pigment dispersion * | 6.0 | 6.0 | 6.0 | 6.0 |
| Viscosity @ 25 C. | 17.6 mPa·s | 77.0 mPa·s | 500 mPa·s | 2500 mPa·s |

The inks of comparative examples 5 to 8 were drawn down onto a vinyl substrate and cured as described for examples 15 and 16. The inks were tested for degree of cure and IPA resistance, as described above, and the results are shown in Table 13.

TABLE 13

| | Film properties before exposure | | | Film properties after exposure | | |
|---|---|---|---|---|---|---|
| | | IPA resistance | | | IPA resistance | |
| Ink | Degree of cure | Colour removal | Film failure | Degree of cure | Colour removal | Film Failure |
| Comparative example 5 | 1 | 1 | 1 | 1 | 1 | 1 |
| Comparative example 6 | 1 | 1 | 1 | 1 | 1 | 1 |
| Comparative example 7 | 1 | 1 | 1 | 4 | 5 | 100+ |
| Comparative example 8 | 1 | 1 | 1 | 4 | 10 | 100+ |

The results confirm that as the percentage of low molecular weight curable material is reduced in the composition, the cure response upon exposure to the low pressure mercury lamp improves. However, comparative examples 7 and 8 are completely unsuitable for use as inkjet inks due to their very high viscosities. The inks of examples 5 and 6 have viscosities of 6.23 mPa·s and 5.94 mPa·s at 25° C., respectively, and are therefore suitable for ink jet printing.

Composition A was prepared, having the formulation shown in Table 14. The ink of composition A is identical to the ink of example 15 but the UVE2500 oligomer has been replaced with trimethylolpropane triacrylate (SR351) having a molecular weight of 296 g/mol. Blends of Example 15 and Composition A in various ratios were then prepared, as shown in Table 15. The blended inks were printed and exposed to UV radiation from a low pressure mercury lamp, as described above for example 15. The printed films were tested for degree of cure and IPA resistance as described above and the results are shown in Table 15.

TABLE 14

| Composition A | |
|---|---|
| SR351 (TMPTA) Sartomer | 16.17 |
| Propylene carbonate | 26.59 |
| Diethylene glycol diethyl ether | 45.24 |
| Irgacure 819 | 4.0 |
| Irgacure 2959 | 2.0 |
| Cyan pigment dispersion * | 6.0 |

TABLE 15

| Ink | Weight ratio of example 15 to composition A in ink blend | Monomer content (wt %) | IPA double rubs | Cure rating 1 to 5 |
|---|---|---|---|---|
| Example 15 | 100/0 | 0 | 30 | 5 |
| Composition B | 90/10 | 1.62 | 20 | 5 |
| Composition C | 80/20 | 3.23 | 18 | 5 |
| Composition D | 70/30 | 4.85 | 15 | 5 |
| Composition E | 60/40 | 6.47 | 12 | 5 |
| Composition F | 50/50 | 8.08 | 6 | 5 |
| Composition G | 40/60 | 9.7 | 6 | 5 |
| Composition H | 30/70 | 11.32 | 6 | 5 |
| Composition I | 20/80 | 12.94 | 5 | 4 |
| Composition J | 10/90 | 14.55 | 2 | 3 |
| Composition A | 0/100 | 16.17 | 1 | 3 |

From the above data it can be seen that the presence of a low molecular weight acrylate monomer reduces the ability of the ink to cure upon exposure to a low pressure mercury lamp, and therefore reduces the solvent resistance of the film.

Composition K having the formulation shown in Table 16 was prepared. Composition K is a base composition that does not include photoinitiator. Composition K was then used to make the inks of examples 17 to 27 of the present invention, having the formulations shown in Table 9.

The inks of example 17 to 27 were printed, oven dried and cured as described above for examples 15 and 16. The IPA resistance was assessed as described above and the results are shown in Table 17.

TABLE 16

| | Composition K |
|---|---|
| Diethylene glycol diether | 44.4 |
| Propylene carbonate | 26.45 |
| UVE 2500-80 | 17.15 |
| Cyan pigment dispersion * | 6.0 |
| Total | 94.0 |

TABLE 17

| | 17 | 18 | 19 | 20 | 21 | 22 | 23 | 24 | 25 | 26 | 27 |
|---|---|---|---|---|---|---|---|---|---|---|---|
| Composition K | 94.0 | 94.0 | 96.0 | 96.0 | 95.0 | 95.0 | 95.0 | 90.0 | 90.0 | 90.0 | 90.0 |
| Irgacure 2959 | 2.0 | 2.0 | 2.0 | 2.0 | — | 5.0 | — | — | — | — | — |
| Luderin TPO | 4.0 | — | — | — | — | — | — | — | — | — | — |

TABLE 17-continued

|  | 17 | 18 | 19 | 20 | 21 | 22 | 23 | 24 | 25 | 26 | 27 |
|---|---|---|---|---|---|---|---|---|---|---|---|
| Irgacure 819 | — | 4.0 | — | — | — | — | — | — | — | — | — |
| Igacure 907 | — | — | 2.0 | — | — | — | — | — | — | — | — |
| Irgacure 369 | — | — | — | 2.0 | — | — | — | — | — | — | — |
| Iracure 651 | — | — | — | — | 5.0 | — | — | — | — | — | — |
| Igacure 184 | — | — | — | — | — | — | 5 | — | — | — | — |
| Genocure EPD | — | — | — | — | — | — | — | 5 | 5 | 5 | 5 |
| Isopropyl thioxanthone | — | — | — | — | — | — | — | 5 | — | — | — |
| 1-chloro-4-propoxythioxanthone | — | — | — | — | — | — | — | — | 5 | — | — |
| Benzophenone | — | — | — | — | — | — | — | — | — | 5 | — |
| Phenyl benzophenone | — | — | — | — | — | — | — | — | — | — | 5 |
| IPA resistance (Double rubs) | 30 | 30 | 27 | 38 | 20 | 22 | 23 | 19 | 23 | 36 | 33 |

As can be seen from Table 17, many combinations of standard photoinitiators are suitable for use with a low pressure mercury lamps in accordance with the present invention.

The ink of example 28 was prepared having the composition shown in Table 18.

TABLE 18

| Example 28 | |
|---|---|
| UVE2500 100% solid | 16.17 |
| Propylene carbonate | 27.33 |
| Diethylene glycol diethyl ether | 46.50 |
| Irgacure 369 | 2.0 |
| Irgacure 2959 | 2.0 |
| Cyan pigment dispersion * | 6.0 |

The ink of example 28 was printed and oven dried as described for examples 15 and 16.

Ink films prepared as above were exposed to a standard low pressure mercury lamp (Triplebright 254 nm from UV Systems Inc.) or an amalgam low pressure mercury lamp (Heraeus NNI50/26 XL). Both lamps were operating at maximum output. In each case the exposure time required to produce a film having an IPA resistance of 40 double rubs was determined and the results are shown in Table 19.

TABLE 19

| | Exposure time to give 40 double rubs IPA (seconds) | |
|---|---|---|
| Ink | Triplebright 254 nm | Heraeus NNI50/26 XL |
| Example 28 | 60 seconds | 30 seconds |

It can be seen from the above cure tests that the amalgam lamps offer significantly reduced exposure time to reach the target of 40 double IPA rubs for the cured film.

The above test was repeated but in this case the lamps were switched on for 20 minutes before exposure and the films were exposed for 60 seconds. The solvent resistance of the exposed films was tested as described above and the results are shown in Table 20.

TABLE 20

| Lamp | IPA double solvent rubs |
|---|---|
| Heraeus NNI50/26 XL | 80 |
| Triplebright 254 nm | 30 |

* Cyan pigment dispersion composition

TABLE 20-continued

| Component | Percentage |
|---|---|
| Disperbyk 168 | 20.0 |
| Rapicure DVE3 | 50.0 |
| Irgalite blue GLVO | 30.0 |

What is claimed is:

1. An inkjet ink comprising at least 50% to 80% by weight of organic solvent based on the total weight of the ink, a radiation curable material, a photoinitiator and optionally a colourant, wherein the solvent is selected from glycol ethers, organic carbonates, lactones, dibasic esters, bio-solvents and mixtures thereof, wherein the radiation curable material is capable of polymerising by free radical polymerisation, and wherein the radiation curable material comprises 50 to 100% by weight of free radical curable monomer, based on the total weight of radiation curable material present in the ink.

2. The inkjet ink according to claim 1 wherein the organic solvent is present in an amount of 60% to 75% by weight based on the total weight of the ink.

3. The inkjet ink according to claim 1 wherein the solvent is selected from propylene carbonate and mixtures of propylene carbonate with one or more glycol ethers.

4. The inkjet ink according to claim 1 wherein the solvent is selected from mixtures of gamma butyrolactone with one or more glycol ethers and mixtures of gamma butyrolactone with one or more glycol ethers and propylene carbonate.

5. The inkjet ink according to claim 1 comprising less than 5% by weight of water based on the total weight of the ink.

6. The ink according to claim 1 wherein the radiation curable material is present in an amount of 2% to 45% by weight based on the total weight of the ink.

7. The inkjet ink according to claim 1 wherein the radiation curable material comprises a radiation curable oligomer.

8. The inkjet ink according to claim 7 wherein the radiation curable oligomer comprises a polyester, urethane, epoxy or polyether backbone.

9. The inkjet ink according to claim 1 wherein the radiation curable material comprises an oligomer having (meth)acrylate groups or a mixture of two or more oligomers having (meth)acrylate groups.

10. The inkjet ink according to claim 9 wherein the radiation curable material comprises a urethane acrylate oligomer.

11. The inkjet ink according to claim 1 which comprises less than 20% by weight of (meth)acrylates with a molecular weight of less than 450 based on the total weight of the ink.

12. The inkjet ink according to claim 1 which is substantially free of (meth)acrylates with a molecular weight of less than 450.

13. The inkjet ink according to claim 1 wherein the radiation curable material is capable of polymerising by cationic polymerisation.

14. The inkjet ink according to claim 13 wherein the radiation curable material is selected from oxetanes, cycloaliphatic epoxides, bisphenol A epoxides, epoxy novolacs and mixtures thereof.

15. The inkjet ink according to claim 1 wherein the radiation curable material comprises a combination of free radical polymerisable and cationically polymerisable materials.

16. An inkjet printing apparatus for printing a solvent-based radiation-curable inkjet ink onto a substrate comprising at least one printhead, a means for evaporating solvent from the printed ink and a source of actinic radiation, wherein the source of actinic radiation is positioned downstream from the means for evaporating solvent from the printed ink so that printed substrate is exposed to the means for evaporating solvent before it is exposed to radiation, allowing evaporation of the solvent before radiation curing of the ink.

17. An inkjet ink comprising at least 50% to 80% by weight of organic solvent based on the total weight of the ink, a radiation curable material, a photoinitiator and optionally a colourant, wherein the solvent is selected from glycol ethers, organic carbonates, lactones, dibasic esters, bio-solvents and mixtures thereof, wherein the radiation curable material comprises 50 to 100% by weight of free radical curable oligomer having a molecular weight of 600 to 4000 and 0 to 50% by weight of free radical curable monomer having a molecular weight of 450 or less based on the total weight of radiation curable material present in the ink; and wherein the photoinitiator is a free radical photoinitiator.

18. A method comprising:
  i) inkjet printing the inkjet ink as defined in claim 1 or claim 17 on to a substrate;
  ii) evaporating at least a portion of the solvent from the printed ink; and
  iii) exposing the printed ink to actinic radiation to cure the radiation curable material.

\* \* \* \* \*